(12) United States Patent
Inoue et al.

(10) Patent No.: US 6,958,856 B2
(45) Date of Patent: Oct. 25, 2005

(54) RAMAN AMPLIFIER, RAMAN AMPLIFIER CONTROL METHOD, AND OPTICAL COMMUNICATION SYSTEM

(75) Inventors: Masayuki Inoue, Yokohama (JP); Motoki Kakui, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 242 days.

(21) Appl. No.: 10/162,596

(22) Filed: Jun. 6, 2002

(65) Prior Publication Data

US 2002/0186456 A1 Dec. 12, 2002

(30) Foreign Application Priority Data

Jun. 7, 2001 (JP) ..................................... P2001-172139

(51) Int. Cl.$^7$ ................................................. H01S 3/00
(52) U.S. Cl. .................................. 359/334; 359/337.11
(58) Field of Search ........................... 359/334, 337.11; 372/3

(56) References Cited

U.S. PATENT DOCUMENTS 6,624,926 B1 * 9/2003 Hayashi et al. ............. 359/334
6,690,504 B1 * 2/2004 Nagel et al. ................. 359/334

FOREIGN PATENT DOCUMENTS

| EP | 1 018 666 A1 | 8/2000 |
| EP | 1 054 489 A2 | 11/2000 |
| JP | 2000-98433 | 4/2000 |
| JP | 2001-7768 | 1/2001 |
| JP | 2002-72262 | 3/2002 |

* cited by examiner

Primary Examiner—Mark Hellner
(74) Attorney, Agent, or Firm—McDermott Will & Emery LLP

(57) ABSTRACT

The present invention provides a Raman amplifier and the like comprising a structure for keeping the flatness of power spectrum of Raman-amplified signal light. The Raman amplifier comprises an optical fiber for Raman-amplifying a plurality of signal channels of signal light having respective center optical frequencies different from each other; a pumping light supply section for supplying N (N being an integer of 2 or more) pumping channels of pumping light having respective center optical frequencies different from each other to the optical fiber; and a feedback section for detecting a part of the signal light Raman-amplified within the optical fiber when the pumping light is supplied thereto, and controlling the pumping light supply section such that the Raman-amplified signal light has a substantially flat power spectrum with respect to an optical frequency direction according to the result of detection. In particular, the feedback section divides the detected Raman-amplified signal light into N optical frequency ranges defined so as to include respective Raman amplification peaks as optical frequencies lower than respective center optical frequencies of the pumping channels of pumping light by an optical frequency shift of about 15 THz, and controls the pumping light supply section such that the Raman-amplified signal light has a power fluctuation of 2 dB or less in each of thus divided N optical frequency ranges.

28 Claims, 11 Drawing Sheets

RAMAN AMPLIFIER, RAMAN AMPLIFIER CONTROL METHOD, AND OPTICAL COMMUNICATION SYSTEM

BACKGROUND OF THE INVENTION

1. Field of the Invention

The present invention relates to a Raman amplifier for Raman-amplifying a plurality of signal channels of signal light by utilizing Raman scattering effect, a method of controlling the Raman amplifier, and an optical communication system including the Raman amplifier.

2. Related Background Art

For improving the information transmission capability of optical communication systems, the wavelength division multiplexing transmission of signal light has become widespread. Such an optical communication system utilizes optical amplifiers directly amplifying the signal light during the transmission. Here, it is important for the optical amplifiers to attain amplification over a wide wavelength range (optical frequency range) and flatten the power spectrum of amplified signal light in the wavelength range (optical frequency range). Typical optical amplifiers are optical fiber amplifiers, such as those doped with rare-earth elements and Raman amplifiers.

Erbium-doped optical fiber amplifiers doped with erbium elements, for example, are typical as rare-earth-element-doped optical fiber amplifiers which are one of types of optical fiber amplifiers. In the erbium-doped optical fiber amplifiers, pumping light having a pumping channel in the wavelength band of 980 nm (corresponding to the band of 306.1 THz in terms of the optical frequency) or 1480 nm (corresponding to the optical frequency band of 202.7 THz) is made incident on an optical fiber doped with erbium element, so as to generate a population inversion state in the erbium-doped optical fiber. When signal light in the wavelength band of 1550 nm (corresponding to the optical frequency band of 193.5 THz) is made incident on the erbium-doped optical fiber generating the population inversion state, the signal light is amplified. The amplification band of such a rare-earth-doped optical fiber amplifier is determined by the kind of rare-earth element added to the optical fiber. For example, in the case of erbium-doped optical fiber amplifiers, the wavelength range in which the amplified signal light has a power fluctuation (power spectrum flatness) of 1 dB or less is 1540 nm (194.8 THz) to 1560 nm (192.3 THz). Further, equalizing filters for correcting the flatness of power spectrum and the like have been employed, thus making it possible for the wavelength range to become 1530 nm (196.1 THz) to 1560 nm (192.3 THz).

However, in response to urgent demands for improving the information transmitting capability of optical communication systems in recent years, the high-density multiplexing of signal light aimed at improving the capability has been reaching its limit. Therefore, in order to further improve the information transmitting capability of optical communication systems, it has been becoming necessary to expand the amplification wavelength band (optical frequency band) in which the amplified signal light has a flat power spectrum.

Raman amplifiers, which are the other type of optical fiber amplifiers, supplies a plurality of pumping channels of pumping light having their respective center wavelengths in the wavelength band of 1400 nm (corresponding to the optical frequency band of 214.3 THz), for example, to an optical fiber constituting at least a part of a transmission line through which the signal light propagates and Raman-amplifying the signal light, so as to utilize Raman scattering effect yielding an amplification peak in a wavelength band (optical frequency band) shifted by 100 nm on the longer wavelength side (by 13 THz on the lower optical frequency side) from the wavelength of pumping light (optical frequency).

Raman amplifiers can amplify signal light in the wavelength band of 1500 nm (corresponding to the optical frequency band of 200.0 THz) when a pumping light source in the wavelength band of 1400 nm (corresponding to the optical frequency band of 214.3 THz), which is typically used in erbium-doped optical fiber amplifiers, is utilized as their pumping light source, for example. When a plurality of pumping channels of pumping light having wavelengths (optical frequencies) different from each other are employed as appropriate, the Raman amplifiers can greatly expand the wavelength band in which the Raman-amplified signal light attains a flat power spectrum as compared with that in erbium-doped optical fiber amplifiers. Japanese Patent Application Laid-Open No. 2000-98433 discloses one comprising a pumping light generating section for generating a plurality of channels of pumping light having different wavelengths (optical frequencies), a WDM coupler for multiplexing the individual pumping channels of pumping light, and an optical output power controller for detecting the output light (Raman-amplified signal light) from the optical amplifier and controlling the pumping light generator according to the result of detection. For reducing the wavelength dependency of amplification to such an extent that no amplification output equalizing filter is necessary, the center wavelength interval in pumping light is 6 nm or more but 35 nm or less.

SUMMARY OF THE INVENTION

The inventors studied the conventional Raman amplifiers in detail and, as a result, have found the following problem. For flattening the wavelength dependency of the output (optical power) of optical amplifier, the conventional Raman amplifiers monitor output light components having respective wavelengths obtained when about 100 nm are added to the respective center wavelengths of the pumping channels of pumping light, and control the respective powers of pumping channels of pumping light such that the respective powers of output light components equal each other. In the case where the signal light is multiplexed in the wavelength direction (optical frequency direction), however, the power spectrum of Raman-amplified signal light, which is Raman-amplified multiplexed signal light, has not sufficiently been flattened due to the interference between signal channels having center wavelengths (center optical frequencies) different from each other. Therefore, it has been difficult for the conventional optical communication systems to improve the transmission capability of optical communication systems.

For overcoming the above-mentioned problem, it is an object of the present invention to provide a Raman amplifier in which, even when Raman-amplifying multiplexed signal light including a plurality of signal channels having respective center optical frequencies different from each other, the power spectrum of the signal light Raman-amplified by pumping light having a plurality of pumping channels whose center optical frequencies differ from each other is flattened with respect to the wavelength direction (optical frequency direction), a method of controlling the Raman amplifier, and an optical communication system including the Raman amplifier.

For convenience, optical frequencies are used instead of wavelengths of light as appropriate in this specification. The conversion expression between light wavelength and optical frequency is $\nu\lambda=c$, where $\nu$ is the optical frequency (Hz), $\lambda$ is the wavelength (m), and c is the light velocity, i.e., $3\times10^8$ (m/s).

For achieving the above-mentioned object, the Raman amplifier according to the present invention comprises a Raman amplification optical fiber, a pumping light supply section, and a feedback section. The Raman amplification optical fiber includes an optical fiber for Raman-amplifying a plurality of signal channels of signal light having respective center optical frequencies different from each other. The pumping light supply section supplies N (N being an integer of 2 or more) pumping channels of pumping light having respective center optical frequencies different from each other to the optical fiber. The feedback section detects a part of the signal light Raman-amplified within the optical fiber when the pumping light is supplied thereto, and controls the pumping light supply section such that the Raman-amplified signal light has a substantially flat power spectrum with respect to an optical frequency direction according to the result of detection.

In particular, in order to realize the flattening of power spectrum in Raman-amplified signal light, the feedback section divides the detected Raman-amplified signal light into N optical frequency ranges defined so as to include respective Raman amplification peaks as optical frequencies lower than respective center optical frequencies of the pumping channels of pumping light by an optical frequency shift of 13.5 to 15.7 THz, and controls the pumping light supply section such that the Raman-amplified signal light has a power fluctuation of 2 dB or less, preferably 1 dB or less in each of thus divided N optical frequency ranges. In this specification, the power fluctuation of Raman-amplified signal light is given by the difference between the highest power and lowest power in the Raman-amplified signal light in the Raman amplification band, and refers to the flatness of power spectrum in the Raman-amplified signal light.

The feedback section may divide the detected Raman-amplified signal light into optical frequency ranges having a number identical to that of the pumping channels of pumping light, and control the pumping light supply section such that the Raman-amplified signal light included in each of thus divided optical frequency ranges has a power average fluctuation of 2 dB or less, preferably 1 dB or less.

This Raman amplifier can easily realize the flattening of power spectrum in Raman-amplified signal light even when Raman-amplifying signal light including a plurality of signal channels multiplexed in the optical frequency direction.

The division of N optical frequency ranges effected by the feedback section may also be set separately depending on whether the above-mentioned integer N=2 or at least 3 as follows:

Preferably, in the case where the above-mentioned integer N=2, the first optical frequency range in the N optical frequency ranges divided by the feedback section when detecting the Raman-amplified signal light is set to a range employing an optical frequency lower by about 15 THz (optical frequency shift) than the midpoint optical frequency between the longer first center optical frequency and the shorter second center optical frequency in the N pumping channels as a lower limit, and an optical frequency lower by about 15 THz than an optical frequency higher than the first center optical frequency by the difference between the first center optical frequency and the midpoint frequency as an upper limit. Preferably, the second optical frequency range in the N optical frequency ranges divided by the feedback section when detecting the Raman-amplified signal light is set to a range employing an optical frequency lower by about 15 THz than the midpoint optical frequency between the first center optical frequency and second center optical frequency as an upper limit, and an optical frequency lower by about 15 THz than an optical frequency lower than the second center optical frequency by the difference between the second center optical frequency and the midpoint frequency as a lower limit.

Preferably in the case where the above-mentioned integer N is 3 or more, whereas pumping channels having the highest center optical frequency, the n-th (n being an integer of 2 or more) highest center optical frequency, and the lowest center optical frequency in the N pumping channels in pumping light are defined as first, n-th, and N-th pumping channels, respectively, first, n-th (n being an integer of 2 or more but (N−1) or less), and N-th optical frequency ranges are set to the following ranges. Namely, the first optical frequency range is set to a range employing an optical frequency lower by about 15 THz (optical frequency shift) than the midpoint optical frequency between the center optical frequency of the first pumping channel and the center optical frequency of the second pumping channel as a lower limit, and an optical frequency lower by about 15 THz than an optical frequency higher than the center optical frequency of the first pumping channel by the difference between the center optical frequency of the first pumping channel and the midpoint frequency as an upper limit. The n-th optical frequency range is set to a range employing an optical frequency lower by about 15 THz than the midpoint optical frequency between the center optical frequency of the n-th pumping channel and the center optical frequency of the (n+1)-th pumping channel as a lower limit, and an optical frequency lower by about 15 THz than the midpoint optical frequency between the center optical frequency of the n-th pumping channel and the center optical frequency of the (n−1)-th pumping channel as an upper limit. The N-th optical frequency range is set to a range employing an optical frequency lower by about 15 THz than the midpoint optical frequency between the center optical frequency of the N-th pumping channel and the center optical frequency of the (N−1)-th pumping channel as an upper limit, and an optical frequency lower by about 15 THz than an optical frequency lower than the center optical frequency of the N-th pumping channel by the difference between the center optical frequency of the N-th pumping channel and the midpoint optical frequency as a lower limit.

Since the N optical frequency ranges are set as those including respective Raman amplification peaks corresponding to the individual pumping channels, the power spectrum flatness of Raman-amplified signal light is stably controlled even when the center optical frequency of each pumping channel or the number of the pumping channels fluctuates. Specific cases where center optical frequencies of pumping channels fluctuate include a case where the pumping power in any of the pumping channels decreases, and a case where the number of the pumping channels, each having a sufficient power such that can effectively contribute to Raman amplification, increases. Preferably, in this case, the feedback section comprises a photodetector for monitoring pumping light and a controller for controlling a pumping light source for supplying the pumping light. The photodetector monitors the power of Raman-amplified signal light and the power of pumping light at each of the center optical frequencies of pumping channels. When dividing the Raman-amplified signal light into optical frequency ranges having a number identical to that of the pumping channels, the controller determines an optical frequency indicating a boundary between the optical frequency ranges according to the result of detection effected by the photodetector. In particular, in at least one of the pumping channels, when the photodetector detects a power reduction reaching such a level that can not effectively contribute to Raman amplification, the controller changes the optical frequency indicating the boundary between the optical frequency ranges by utilizing the remaining pumping channels without the pumping channel in which the power reduction is occurred. On the other hand, when the photodetector detects an occurrence of a pumping channel having such a sufficient power that can effectively contribute to Raman amplification, the controller changes the optical frequency indicating the boundary between the optical frequency ranges by utilizing whole pumping channels including the pumping channel having the sufficient power. Preferably, the photodetector includes an optical performance monitor for detecting multiplexed monitor light in which a plurality of signal channels of the Raman-amplified signal light and a plurality of pumping channels of the pumping light are multiplexed.

Preferably, in the Raman amplifier according to the present invention, the pumping channels in the pumping light have a center optical frequency interval of 4 THz or less therebetween. In this case, Raman amplification bands caused by N pumping channels of pumping light having respective center optical frequencies different from each other are superposed close to each other in the optical frequency direction, whereby the power spectrum flatness of Raman-amplified signal light can be improved.

The feedback section comprises a photodetector for receiving a part of Raman-amplified signal light and outputting an electric signal corresponding to a power of the Raman-amplified signal light, and a controller for controlling the pumping light supply section according to an electric signal outputted from the photodetector. Here, the photodetector preferably includes an optical performance monitor. As a consequence, the photodetector exhibits a higher light-receiving accuracy for Raman-amplified signal, thereby being able to control the power spectrum flatness of Raman-amplified signal light at a high accuracy and improve the same.

The photodetector may comprise a demultiplexing section for demultiplexing the Raman-amplified signal light into N optical frequency ranges, and a light-receiving section for receiving each of thus demultiplexed Raman-amplified signal light components. Here, the demultiplexing section preferably includes at least one of an optical circuit comprising a dielectric optical filter, and an optical circuit comprising an optical circulator and a Bragg diffraction grating. When the light-receiving section is constituted by an optical filter made of a dielectric, the demultiplexing of Raman-amplified signal light into N optical frequency ranges different from each other can be realized at a low cost. When the optical circuit of the light-receiving section is constituted by an optical circulator and a Bragg diffraction grating, not only the demultiplexing of Raman-amplified signal light into N optical frequency ranges different from each other can be realized at a low cost, but also the light-receiving accuracy can be enhanced.

In Raman amplification comprising the structure mentioned above, the method of controlling a Raman amplifier according to the present invention flattens the power spectrum of Raman-amplified signal light with respect to the optical frequency direction. Specifically, this controlling method supplies pumping light to a Raman amplification optical fiber, detects a part of signal light Raman-amplified (Raman-amplified signal light), and flattens the power spectrum of the detected Raman-amplification signal light with respect to the optical frequency direction.

The pumping light includes N (N being an integer of 2 or more) channels having respective center optical frequencies different from each other. The flattening of Raman-amplified signal light is effected by dividing the detected Raman-amplified signal light into N optical frequency ranges defined so as to include respective Raman amplification peaks as optical frequencies lower than respective center optical frequencies of the pumping channels of pumping light by an optical frequency shift of 13.5 to 15.7 THz, and controlling the pumping light supply section such that the Raman-amplified signal light has a power fluctuation of 2 dB or less, preferably 1 dB or less in each of thus divided N optical frequency ranges.

In the control method according to the present invention, the flattening of Raman-amplified signal light may be carried out by dividing the detected Raman-amplified signal light into optical frequency ranges having a number identical to that of the pumping channels of pumping light, and controlling the pumping light supply section such that the Raman-amplified signal light included in each of thus divided optical frequency ranges has a power average fluctuation of 2 dB or less, preferably 1 dB or less.

Since the controlling method is configured so as to divide Raman-amplified signal light into predetermined optical frequency ranges and minimize signal light power fluctuations among thus divided optical frequency ranges, the power spectrum of Raman-amplified signal light can easily be flattened even when Raman-amplifying signal light multiplexed in the optical frequency direction.

The division of N optical frequency ranges may be set as mentioned above depending on whether the above-mentioned integer N=2 or 3. The N optical frequency ranges include respective Raman amplification peaks as optical frequencies lower by about 15 THz (optical frequency shift) than respective center optical frequencies of N pumping channels having center optical frequencies different from each other. Each of the Raman amplification peaks is located near the midpoint of its corresponding optical frequency range divided beforehand. Therefore, even when the center optical frequency of each pumping channel or the number of the pumping channels fluctuates, the power spectrum flatness of Raman-amplified signal light can stably be controlled. Specific cases where center optical frequencies of pumping channels fluctuate include a case where the pumping power in any of the pumping channels decreases, and a case where the number of the pumping channels, each having a sufficient power such that can effectively contribute to Raman amplification, increases. In this case, when dividing the Raman-amplified signal light into optical frequency ranges having a number identical to the pumping channels, an optical frequency indicating a boundary between the optical frequency ranges is determined according to a result of the detection of a pumping light power in each of the center optical frequencies of pumping channels. In at least one of the pumping channels, when a power reduction reaching such a level that can not effectively contribute to Raman amplification is detected, the optical frequency indicating the boundary between the optical frequency ranges is changed by utilizing the remaining pumping channels without the pumping channel in which the power reduction is occurred. On the other hand, when an occurrence of a pumping channel having such a sufficient power that can effectively contribute to Raman amplification is detected, the optical frequency indicating the boundary between the optical frequency ranges is changed by utilizing whole pumping channels including the pumping channel having the sufficient power.

The optical communication system according to the present invention is an optical communication system for carrying out optical communications by transmitting signal light, the system including at least one Raman amplifier having the same structure as that of the Raman amplifier mentioned above (Raman amplifier according to the present invention).

Since the power spectrum of Raman-amplified signal light at the time of relaying becomes flat with respect to the optical frequency direction, this optical communication system can effectively suppress malfunctions while enhancing the information transmitting capability of the optical communication system. In other words, an optical communication system with stable communicating operations can be realized while enhancing the information transmitting capability thereof.

The present invention will be more fully understood from the detailed description given hereinbelow and the accompanying drawings, which are given by way of illustration only and are not to be considered as limiting the present invention.

Further scope of applicability of the present invention will become apparent from the detailed description given herein after. However, it should be understood that the detailed description and specific examples, while indicating preferred embodiments of the invention, are given by way of illustration only, since various changes and modifications within the spirit and scope of the invention will be apparent to those skilled in the art from this detailed description.

DETAILED DESCRIPTION OF THE PREFERRED EMBODIMENTS

In the following, embodiments of the Raman amplifier and the like according to the present invention will be explained with reference to FIGS. 1 to 11, 12A, 12B, 13, 14A, 14B, 15 and 16. In the explanation of the drawings, constituents identical to each other will be referred to with numerals identical to each other without repeating their overlapping descriptions.

Figure 1:
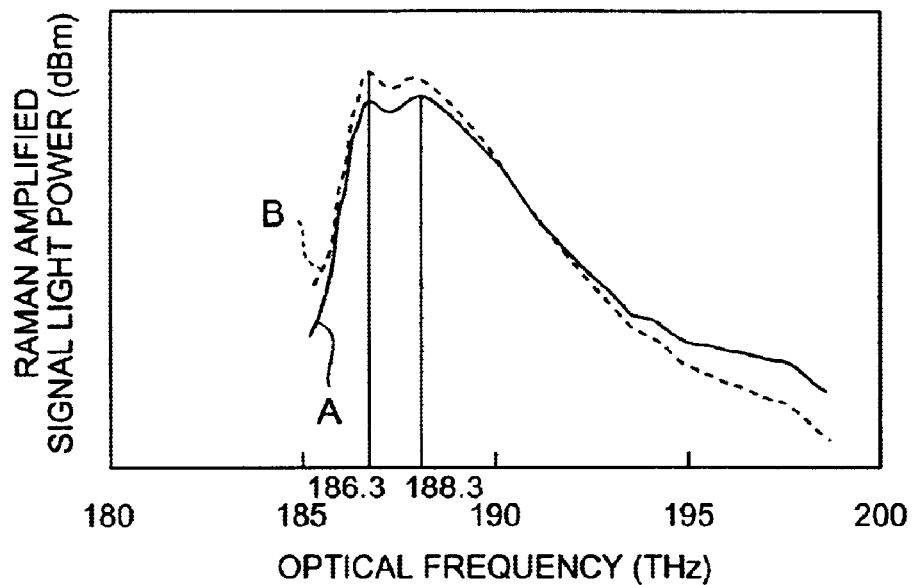
FIG. 1 shows respective Raman amplification spectra obtained when signal light not multiplexed and multiplexed signal light are Raman-amplified by pumping light including a pumping channel with a center optical frequency of 201.3 THz.

First, how the present invention has been accomplished will be explained. FIG. 1 shows respective Raman spectra (power spectra) obtained when signal light not multiplexed and multiplexed signal light are Raman-amplified by pumping light including a pumping channel with a center optical frequency of 201.3 THz.

Spectrum A is a Raman amplification spectrum in a case where signal light propagating through an optical fiber is not multiplexed in the optical frequency direction. The optical frequency at which spectrum A attains the maximum amplification is 188.3 THz, which is lower than the center optical frequency of pumping light by 13 THz.

On the other hand, spectrum B is a Raman amplification spectrum in a case where signal light having 40 signal channels multiplexed in the optical frequency direction within the range from 186.3 THz to 195.8 THz is Raman-amplified as signal light propagating through the optical fiber. The optical frequency at which spectrum B attains the maximum amplification is 186.3 THz and thus is different from the case of signal light not multiplexed in the optical frequency direction. This optical frequency is lower than the center optical frequency of pumping channel by 15 THz.

FIGS. 2 to 5 show Raman amplification spectra obtained when signal light having 40 signal channels multiplexed in the optical frequency direction within the range from 186.3 THz to 195.8 THz, as signal light propagating through an optical fiber, is Raman-amplified by supplying a plurality of pumping channels of pumping light having respective center optical frequencies different from each other to the optical fiber.

Figure 2:
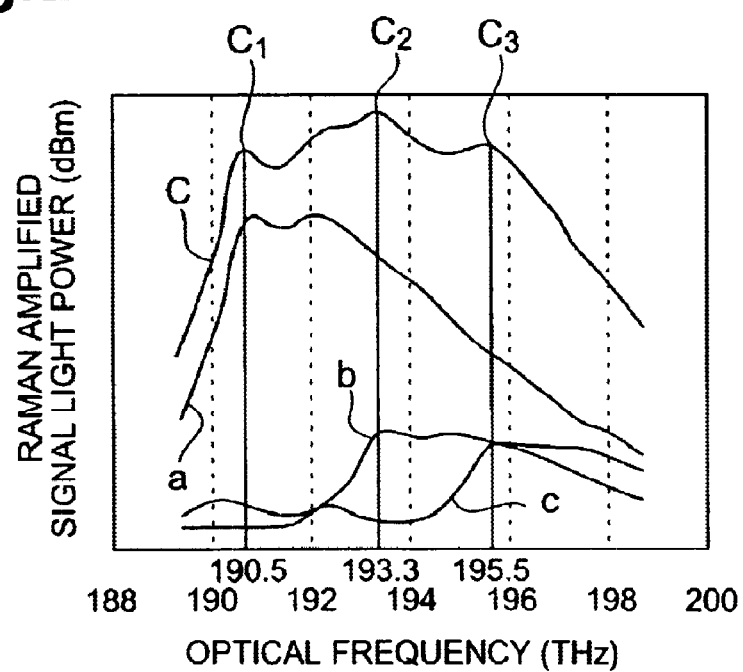
FIG. 2 shows respective Raman amplification spectra obtained when multiplexed signal light is Raman-amplified by three pumping channels of pumping light having center optical frequencies different from each other.

FIG. 2 shows Raman amplification spectra obtained by utilizing three pumping channels of pumping light having center optical frequencies of 205.5 THz, 208.3 THz, and 210.5 THz, respectively. Here, spectra a to c are Raman amplification spectra with respect to pumping channels whose center optical frequencies are 205.5 THz, 208.3 THz, and 210.5 THz, respectively. Spectrum C is a superposed spectrum obtained when spectra a to c are superposed. In FIG. 2, the respective optical frequencies attaining the maximum amplification concerning spectra a to c are lower than the respective center optical frequencies of pumping channels by 15 THz. In spectrum C, Raman amplification peaks $C_1$ to $C_3$ also exist at respective optical frequencies lower than the center optical frequencies of three pumping channels by 15 THz.

Figure 3:
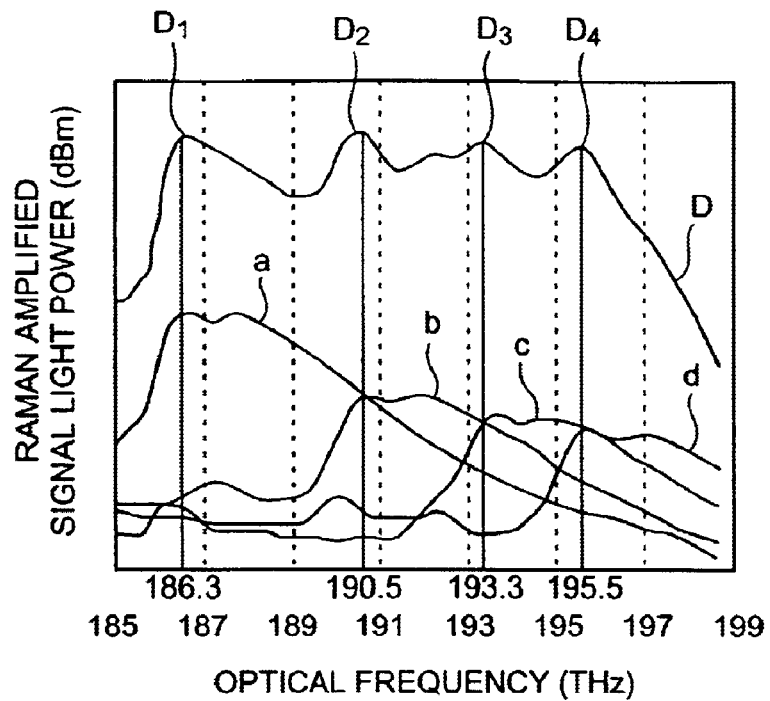
FIG. 3 shows respective Raman amplification spectra obtained when multiplexed signal light is Raman-amplified by four pumping channels of pumping light having center optical frequencies different from each other.
Figure 4:
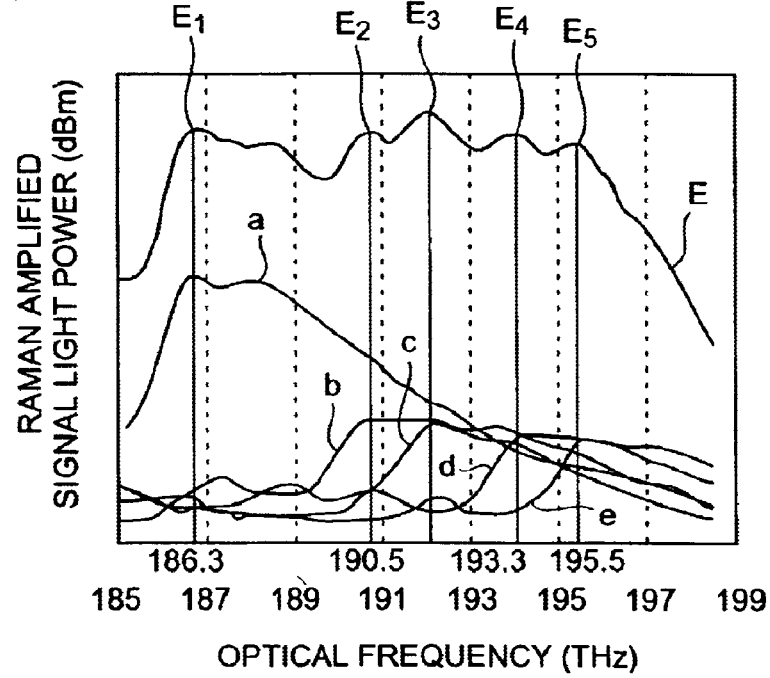
FIG. 4 shows respective Raman amplification spectra obtained when multiplexed signal light is Raman-amplified by five pumping channels of pumping light having center optical frequencies different from each other.
Figure 5:
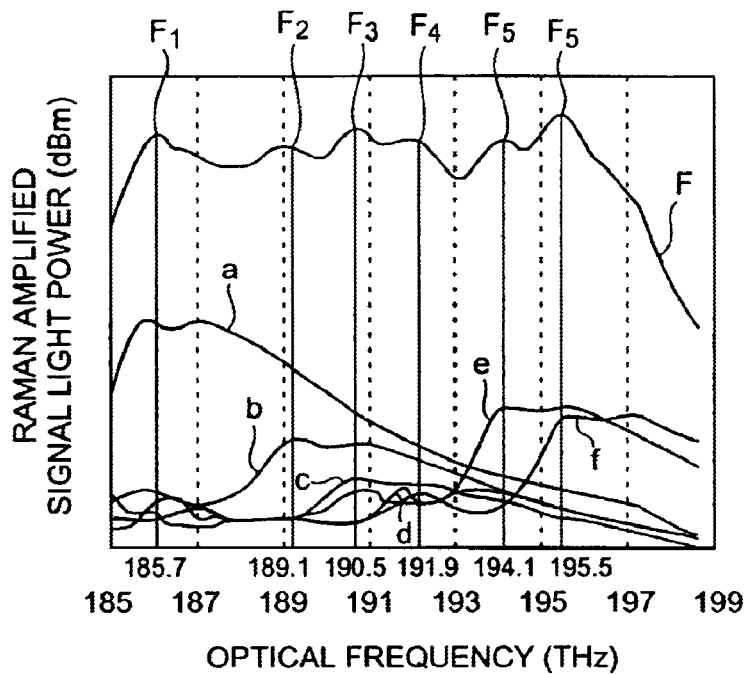
FIG. 5 shows respective Raman amplification spectra obtained when multiplexed signal light is Raman-amplified by six pumping channels of pumping light having center optical frequencies different from each other.

Similarly, FIGS. 3 to 5 show their corresponding Raman amplification spectra a to f with respect to individual pumping channels and superposed Raman amplification spectra D to F obtained by superposing their corresponding spectra a to f in respective cases utilizing four pumping channels of pumping light whose center optical frequencies are 201.3 THz, 205.5 THz, 208.3 THz, and 210.5 THz, five pumping channels of pumping light whose center optical frequencies are 201.3 THz, 205.5 THz, 206.9 THz, 209.1 THz, and 210.5 THz, and six pumping channels of pumping light whose center optical frequencies are 201.3 THz, 205.5 THz, 206.9 THz, 209.1 THz, and 210.5 THz. As in FIG. 2, the respective optical frequencies attaining the maximum amplification concerning spectra a to f are lower than the respective center optical frequencies of pumping channels by about 15 THz in FIGS. 3 to 5. In superposed spectra D to F, Raman amplification peaks $D_1$ to $D_4$, $E_1$ to $E_5$, and $F_1$ to $F_6$ also exist at respective optical frequencies lower than the center optical frequencies of pumping channels by 15 THz.

In the Raman amplification of a plurality of signal channels of signal light multiplexed in the optical frequency direction, as can be seen from FIGS. 1 to 5, optical frequencies attaining the maximum Raman amplification become optical frequencies lower by about 15 THz than respective center optical frequencies of pumping channels due to the interference between signal channels having respective center optical frequencies different from each other. In superposed Raman amplification spectra obtained when Raman amplification spectra with respect to a plurality of pumping channels having respective center optical frequencies different from each other, Raman amplification peaks also exist at respective optical frequencies lower by about 15 THz than the center optical frequencies of a plurality of pumping channels.

Figure 6:
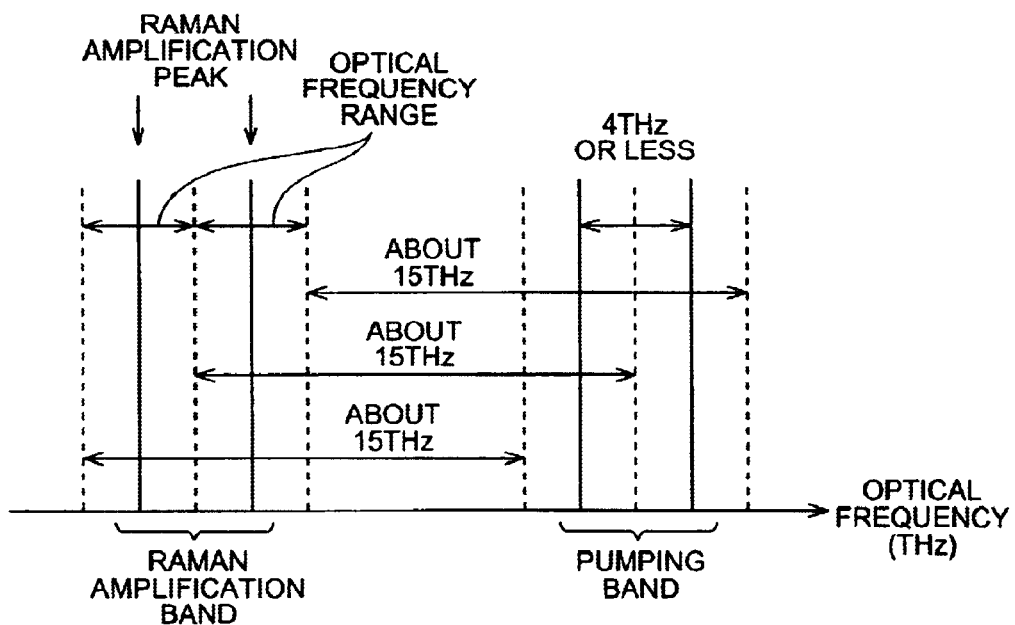
FIG. 6 is a view for explaining a method of setting optical frequency ranges for monitoring multiplexed signal light.

For flattening the power spectrum of Raman-amplified signal light in the optical frequency direction when making a plurality of pumping channels of pumping light having respective center optical frequencies different from each other incident on a Raman amplification optical fiber and Raman-amplifying a plurality of signal channels of signal light multiplexed in the optical frequency direction, it will be considered sufficient if control is carried out as follows. Namely, as shown in FIG. 6, the optical frequency range is divided so as to include respective Raman amplification peaks (existing at optical frequencies lower by an optical frequency shift of about 15 THz than respective center optical frequencies of pumping channels) seen in a superposed Raman amplification spectrum in which respective Raman amplification spectra concerning the pumping channels (the interval between the center optical frequencies of pumping channels being preferably 4 THz or less), and the output of pumping light corresponding to the Raman amplification peak included in each of thus divided optical frequency ranges is controlled such that the power fluctuation of Raman-amplified signal light in each optical frequency range falls within a predetermined range, e.g., 2 dB or less, preferably 1 dB or less. This realizes the power spectrum flattening of Raman-amplified signal light in a wide optical frequency band which is Raman-amplified by a plurality of pumping channels of pumping light. The present invention has been achieved by the foregoing inventors' findings.

Figure 7:
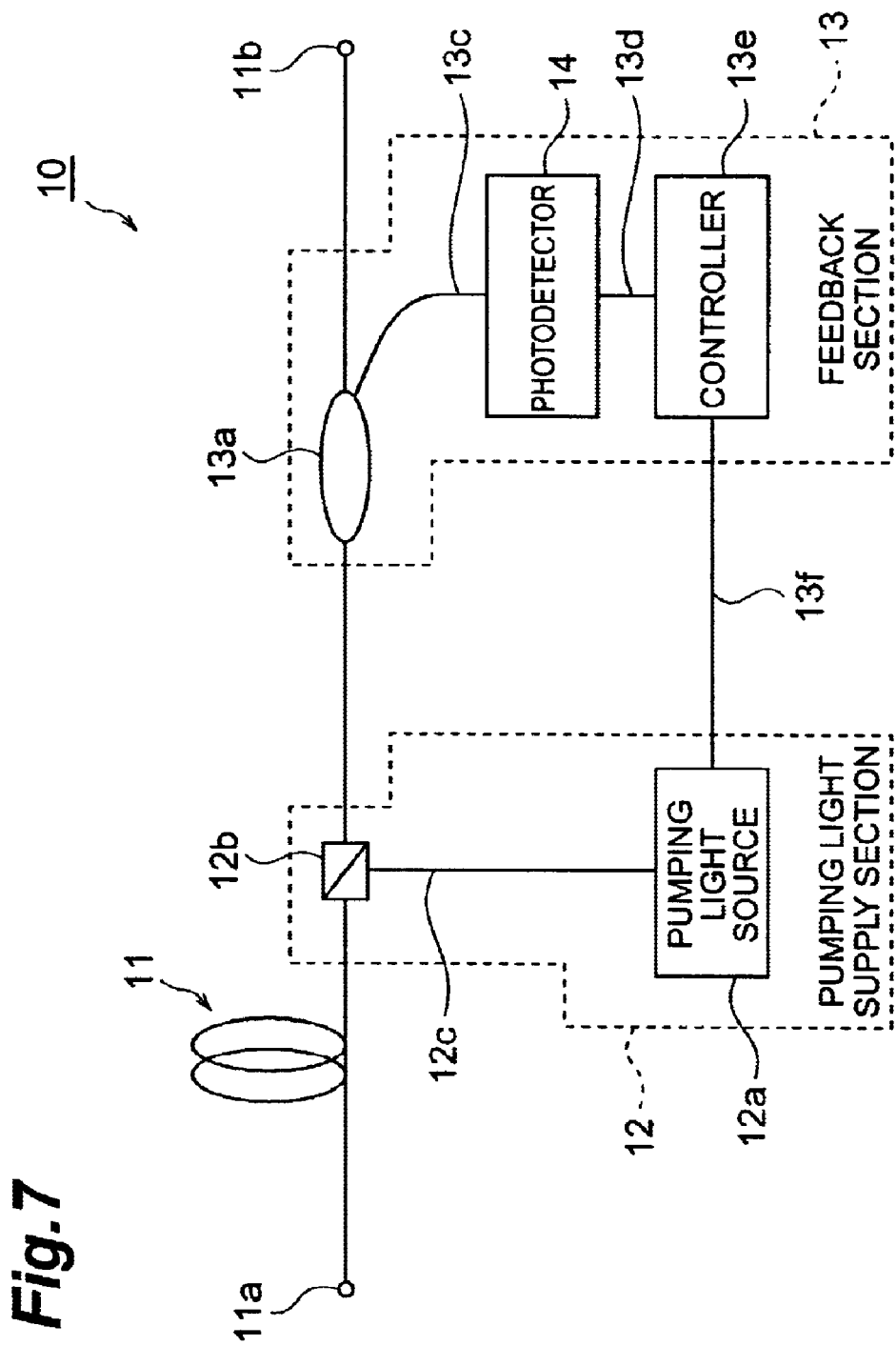
FIG. 7 is a view showing the configuration of a first embodiment of the Raman amplifier according to the present invention.

The Raman amplifier and method of controlling a Raman amplifier according to the present invention will now be explained. FIG. 7 is a diagram showing the configuration of a first embodiment of the Raman amplifier according to the present invention. In FIG. 7, the Raman amplifier 10 comprises an optical fiber 11 for Raman-amplifying signal light propagating therethrough, a pumping light supply section 12 for supplying the optical fiber 11 with pumping light, and a feedback section 13 for detecting the signal light Raman-amplified (Raman-amplified signal light) and controlling the pumping light supply section 12 so as to flatten the power spectrum of Raman-amplified signal light according to the result of detection. Here, the signal light is one including a plurality of signal channels having respective center optical frequencies different from each other, e.g., signal light in which 40 signal channels having a center optical frequency interval of 100 GHz in terms of optical frequency are multiplexed.

The optical fiber 11 comprises an input end 11a and an output end 11b, and Raman-amplifies signal light with pumping light supplied from the pumping light supply section 12 during when the signal light propagates from the input end 11a to the output end 11b.

The pumping light supply section 12 comprises a pumping light source 12a for outputting the pumping light, a multi/demultiplexer 12b for guiding the pumping light to the optical fiber 11, and an optical fiber 12c for guiding the pumping light outputted from the pumping light source 12a to the multi/demultiplexer 12b.

The pumping light source 12a outputs N (N being an integer of N≧2) pumping light components (pumping channels) having respective center optical frequencies different from each other. The pumping light source 12a may comprise N light-emitting devices for outputting respective pumping light sources having center optical frequencies different from each other, and optical fibers and an optical multiplexer for multiplexing the light components emitted from the light-emitting devices into the optical fiber 11. In this case, each of the N light-emitting devices outputting respective pumping light components having center optical frequencies different from each other may be a semiconductor light-emitting device formed with light-reflecting and light-emitting surfaces opposing each other with an active region interposed therebetween, whereas a driving signal is supplied to each light-emitting device from the outside of the pumping light source 12a. The driving signal supplied to each light-emitting device is changed as appropriate, whereby the output power of pumping light from each light-emitting device is adjusted. Here, the pumping channels included in pumping light are referred to as n-th (n being an integer of 1 or more but N or less) pumping channels in descending order of their center optical frequencies.

The optical multi/demultiplexer 12b is disposed between the input end 11a and output end 11b of the optical fiber 11 and transmits therethrough the signal light propagating from the input end 11a side toward the output end 11b, while guiding to the optical fiber 11 the pumping light having reached there from the pumping light source 12a by way of the optical fiber 12c. The pumping light introduced into the optical fiber 11 propagates through the optical fiber 11 from the optical multi/demultiplexer 12b toward the input end 11a, thereby contributing to Raman amplification of the signal light propagating from the input end 11a. The signal light propagating from the input end 11a is Raman-amplified when the pumping light is supplied from the pumping light source 12a, whereby the Raman-amplified signal light propagates toward the optical multi/demultiplexer 12b. The Raman-amplified signal light transmitted through the optical multi/demultiplexer 12b further propagates through the output end 11b.

The feedback section 13 comprises an optical branching device 13a for branching a part of the signal light Raman-amplified within the optical fiber 11, a photodetector 14 for detecting the Raman-amplified signal light branched by the optical branching device 13a, and a controller 13e for controlling the pumping light source 12a so as to flatten the power spectrum of Raman-amplified signal light with respect to the optical frequency direction according to the result detected by the photodetector 14. The optical branching device 13a and the photodetector 14 are optically connected to each other by an optical fiber 13c, the photodetector 14 and the controller 13e are electrically connected to each other by an electric signal line 13d, and the controller 13e and the pumping light source 12a are electrically connected to each other by an electric signal line 13f.

The optical branching device 13a is disposed between the optical multi/demultiplexer 12b and the output end 11b, and transmits therethrough substantially all the Raman-amplified signal light toward the output end 11b while guiding a part of the Raman-amplified signal light to the optical fiber 13c. The optical power of Raman-amplified signal light guided to the optical fiber 13c is about 5% of that of Raman-amplified signal light reaching the optical branching device 13a after propagating through the optical fiber 11 from the optical multi/demultiplexer 12b.

The photodetector 14 receives the part of Raman-amplified signal light branched by the optical branching device 13a and outputs an electric signal corresponding to the optical power of this part of Raman-amplified signal light to the controller 13e by way of the electric signal line 13d.

The controller 13e is constituted by semiconductor IC devices and the like, and calculates a driving signal level for flattening the power spectrum of Raman-amplified signal light with respect to the optical frequency direction according to the electric signal supplied from the photodetector 14. The controller 13e supplies the driving signal at thus calculated level to the pumping light source 12a via the line 13f.

In the Raman amplifier and the method of controlling a Raman amplifier, the feedback section 13 divides the Raman-amplified signal light into N optical frequency ranges set so as to include respective Raman amplification peaks as optical frequencies lower by 15 THz (optical frequency shift) than respective center optical frequencies of N pumping channels having center optical frequencies different from each other, and controls the pumping light supply section 12 such that, for example, the Raman-amplified signal light within each optical frequency range attains a power fluctuation of 2 dB or less, preferably 1 dB or less, in order for the detected values based on signal light in these optical frequency ranges to become substantially equal to each other. More specifically, the photodetector 14 receives Raman-amplified signal light in each of the N optical frequency ranges set so as to include respective Raman amplification peaks corresponding to N pumping channels having center optical frequencies different from each other. Further, the photodetector 14 outputs an electric signal corresponding to the optical power of Raman-amplified signal light received for each of the N optical frequency ranges to the controller 13e. The controller 13e calculates an average value of the electric signal received for each of the N optical frequency ranges. Then, it calculates a driving signal for controlling the pumping light source 12a such that, for example, the power fluctuation becomes 2 dB or less, preferably 1 dB or less, in order for the respective average values of N electric signals to become substantially equal to each other. The driving signal at thus calculated level is supplied from the controller 13e to the pumping light source 12a by way of the electric signal line 13f. Therefore, even when the signal light multiplexed in the optical frequency direction is Raman-amplified by N pumping channels of pumping light having center optical frequencies different from each other, the power spectrum of Raman-amplified signal light can be made flat with respect to the optical frequency direction. The photodetector 14 supplies an electric signal to the controller 13e so that the correlation between the optical power and optical frequency of received Raman-amplified signal light can be seen. The controller 13e may divide Raman-amplified signal light into N optical frequency ranges set so as to include respective Raman amplification peaks which are seen as optical frequencies lower by about 15 THz from N pumping channels having center optical frequencies different from each other, respectively.

The division of N optical frequency ranges effected by the feedback section is set separately depending on whether the above-mentioned integer N=2 or at least 3 as follows:

In the case where the above-mentioned integer N=2, the first optical frequency range in the N optical frequency ranges divided by the feedback section when detecting the Raman-amplified signal light is set to a range employing an optical frequency lower by about 15 THz (optical frequency shift) than the midpoint optical frequency between the longer first center optical frequency and the shorter second center optical frequency in the N pumping channels as a lower limit, and an optical frequency lower by about 15 THz than an optical frequency higher than the first center optical frequency by the difference between the first center optical frequency and the midpoint frequency as an upper limit. The second optical frequency range in the N optical frequency ranges divided by the feedback section when detecting the Raman-amplified signal light is set to a range employing an optical frequency lower by about 15 THz than the midpoint optical frequency between the first center optical frequency and second center optical frequency as an upper limit, and an optical frequency lower by about 15 THz than an optical frequency lower than the second center optical frequency by the difference between the second center optical frequency and the midpoint frequency as a lower limit.

In the case where the above-mentioned integer N is 3 or more, whereas pumping channels having the highest center optical frequency, the n-th (n being an integer of 2 or more) highest center optical frequency, and the lowest center optical frequency in the N pumping channels in pumping light are defined as first, n-th, and N-th pumping channels, respectively, first, n-th (n being an integer of 2 or more but N−1) or less), and N-th optical frequency ranges are set to the following ranges. Namely, the first optical frequency range is set to a range employing an optical frequency lower by about 15 THz (optical frequency shift) than the midpoint optical frequency between the center optical frequency of the first pumping channel and the center optical frequency of the second pumping channel as a lower limit, and an optical frequency lower by about 15 THz than an optical frequency higher than the center optical frequency of the first pumping channel by the difference between the center optical frequency of the first pumping channel and the midpoint frequency as an upper limit. The n-th optical frequency range is set to a range employing an optical frequency lower by about 15 THz than the midpoint optical frequency between the center optical frequency of the n-th pumping channel and the center optical frequency of the (n+1)-th pumping channel as a lower limit, and an optical frequency lower by about 15 THz than the midpoint optical frequency between the center optical frequency of the n-th pumping channel and the center optical frequency of the (n−1)-th pumping channel as an upper limit. The N-th optical frequency range is set to a range employing an optical frequency lower by about 15 THz than the midpoint optical frequency between the center optical frequency of the N-th pumping channel and the center optical frequency of the (N−1)-th pumping channel as an upper limit, and an optical frequency lower by about 15 THz than an optical frequency lower than the center optical frequency of the N-th pumping channel by the difference between the center optical frequency of the N-th pumping channel and the midpoint optical frequency as a lower limit.

As mentioned above, the N optical frequency ranges include respective Raman amplification peaks corresponding to N pumping channels having respective N center optical frequencies different from each other, and the Raman amplification peaks are detected near the respective midpoints of their corresponding optical frequency ranges.

Figure 8:
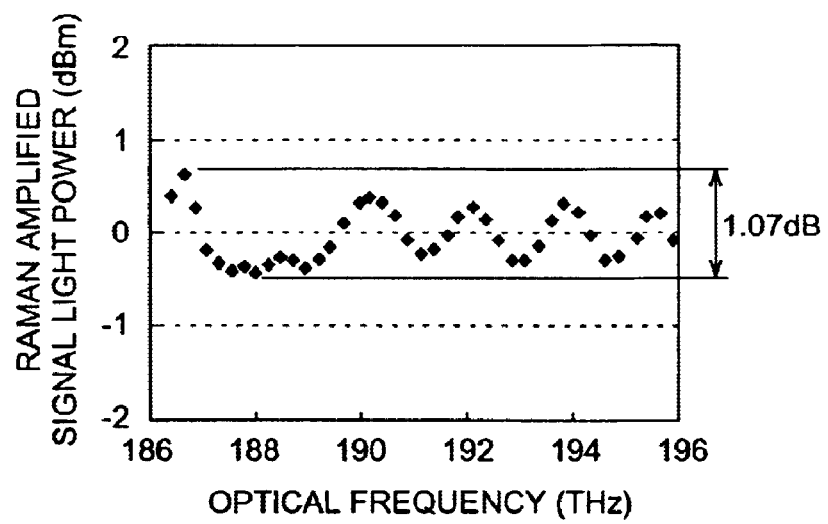
FIG. 8 shows a Raman amplification spectrum (with a power fluctuation of 1.07 dB) obtained when multiplexed signal light is Raman-amplified by five pumping channels of pumping light having center optical frequencies different from each other in a case where optical frequency ranges are set such that optical frequencies lower by 15 THz than the respective center optical frequencies of the pumping channels included in the pumping light are located as their midpoints.
Figure 9:
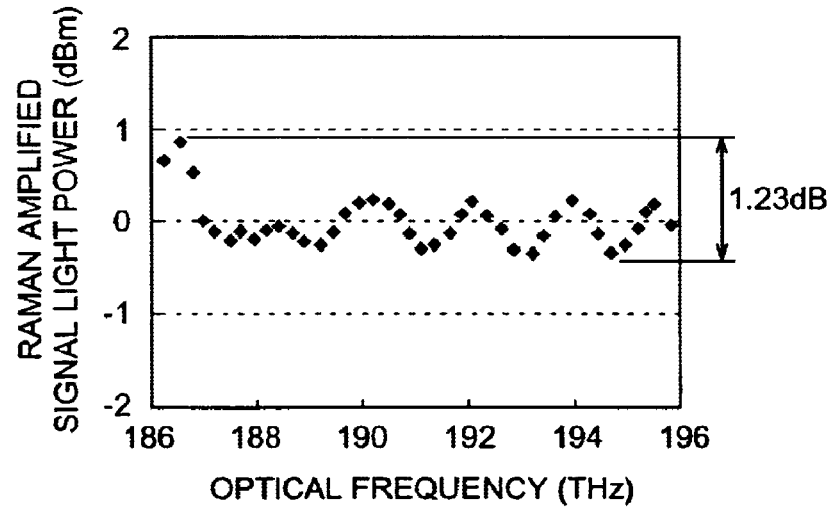
FIG. 9 shows a Raman amplification spectrum (with a power fluctuation of 1.23 dB) obtained when multiplexed signal light is Raman-amplified by five pumping channels of pumping light having center optical frequencies different from each other in a case where optical frequency ranges are set such that optical frequencies lower by 14 THz than the respective center optical frequencies of the pumping channels included in the pumping light are located as their midpoints.
Figure 10:
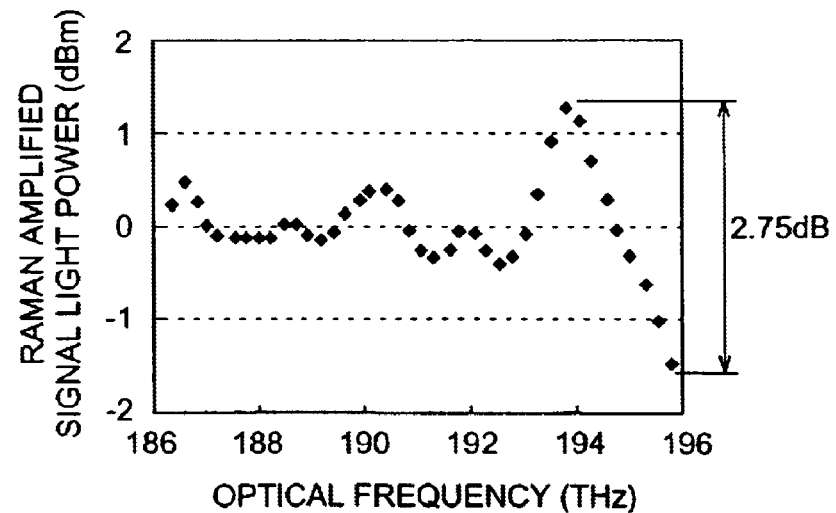
FIG. 10 shows a Raman amplification spectrum (with a power fluctuation of 2.77 dB) obtained when multiplexed signal light is Raman-amplified by five pumping channels of pumping light having center optical frequencies different from each other in a case where optical frequency ranges are set such that optical frequencies lower by 16 THz than the respective center optical frequencies of the pumping channels included in the pumping light are located as their midpoints.

FIGS. 8 to 10 show Raman amplification spectra obtained when 40 channels of signal light with their center optical frequencies ranging from 186.3 THz to 195.8 THz was Raman-amplified by five pumping channels of pumping light having respective center optical frequencies of 201.3 THz, 204.8 THz, 206.9 THz, 208.8 THz, and 210.5 THz in the Raman amplifier 10 shown in FIG. 7 in a case where the Raman-amplified signal light was divided into five optical frequency ranges such that optical frequencies lower by 14 THz, 15 THz, and 16 THz than the respective center optical frequencies of the five pumping channels were located near their midpoints, respectively, and the pumping light source 12a was controlled according to the result of detected optical power in the Raman-amplified signal light in each of thus divided optical frequency ranges. The signal light power at the input end 11a was 8 dBm/ch, whereas the target power of Raman-amplified signal light at the output end 11b was 0 dBm/ch. The initial value of pumping light power was 100 mW at each of center optical frequencies of five pumping channels for backward pumping. The length of optical fiber 11 from the input end 11a to the optical multi/demultiplexer 12b was 80 km.

The power fluctuation in respective signal channels included in the Raman-amplified signal light was 1.23 dB in the case shown in FIG. 9 in which the optical frequency shift was 14 THz, and 2.75 dB in the case shown in FIG. 10 in which the optical frequency shift was 16 THz. In the case shown in FIG. 8 in which the optical frequency shift was 15 THz, by contrast, the power fluctuation was 1.07 dB. This indicates it advantageous to divide optical frequency ranges for detecting Raman-amplified signal light such that optical frequencies lower by about 15 THz than respective center optical frequencies of pumping channels are located near midpoints thereof, in order to flatten the power spectrum of Raman-amplified signal light with respect to the optical frequency direction. Here, the power fluctuation is given by the difference between the highest and lowest powers of Raman-amplified signal light in the Raman amplification band.

Figure 11:
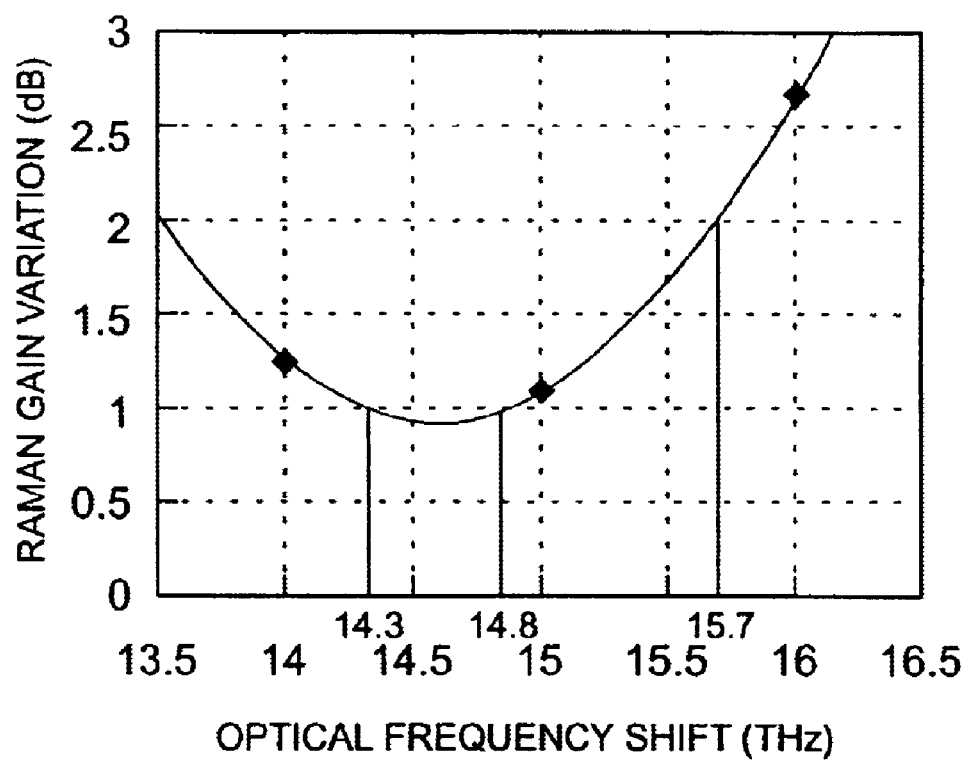
FIG. 11 is a graph showing the relationship between optical frequency shift and gain variation (power fluctuation of Raman-amplified signal light)

The inventors studied the relationship between optical frequency shift and gain variation (power fluctuation of Raman-amplified signal light). FIG. 11 is a graph showing the relationship between optical frequency shift and gain variation. As can be seen from this graph, the optical frequency shift is preferably within the range of 13.5 to 15.7 THz in order to suppress the power fluctuation of Raman-amplified signal light to 2 dB or less, and more preferably within the range of 14.3 to 14.7 THz in order to suppress the power fluctuation of Raman-amplified signal light to 1 dB or less.

The photodetector 14 may be an optical performance monitor such as an optical spectrum analyzer, for example. When an optical performance monitor such as optical spectrum analyzer is employed in the photodetector 14 as such, the accuracy of resolving the optical frequency improves, whereby Raman-amplified signal light can be detected with a high accuracy. Therefore, the power spectrum flattening of Raman-amplified signal light can be controlled with a high accuracy, whereby the flatness of power spectrum improves. In addition, when an optical performance monitor such as optical spectrum analyzer is employed in the photodetector 14, the Raman-amplified signal light branched by the optical branching device 13a can be detected without further branching or demultiplexing the Raman-amplified signal light branched by the optical branching device 13a, whereby it will be sufficient if the Raman-amplified signal light branched by the optical branching device 13a has a low power. In particular, since the Raman-amplified signal light can efficiently be captured from the output end 11b, the amplification efficiency of the Raman amplifier can be enhanced in this case.

Figure 12A:
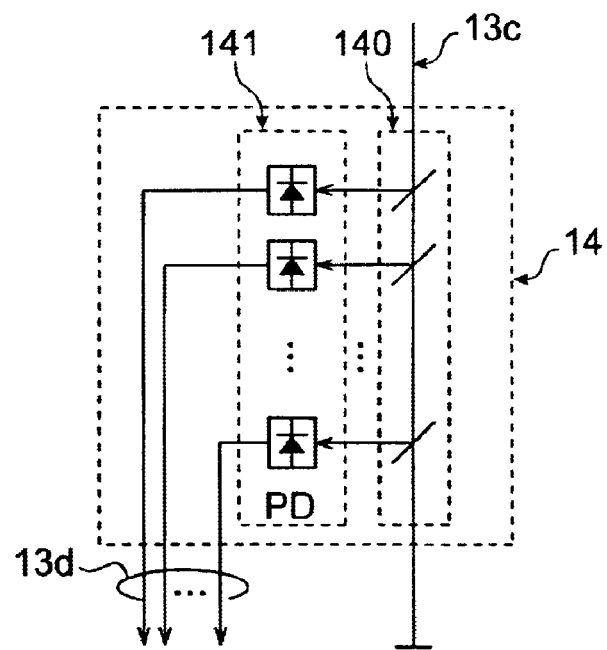
FIGS. 12A and 12B are diagrams showing other configurations of the photodetector in the Raman amplifier according to the present invention.
Figure 12B:
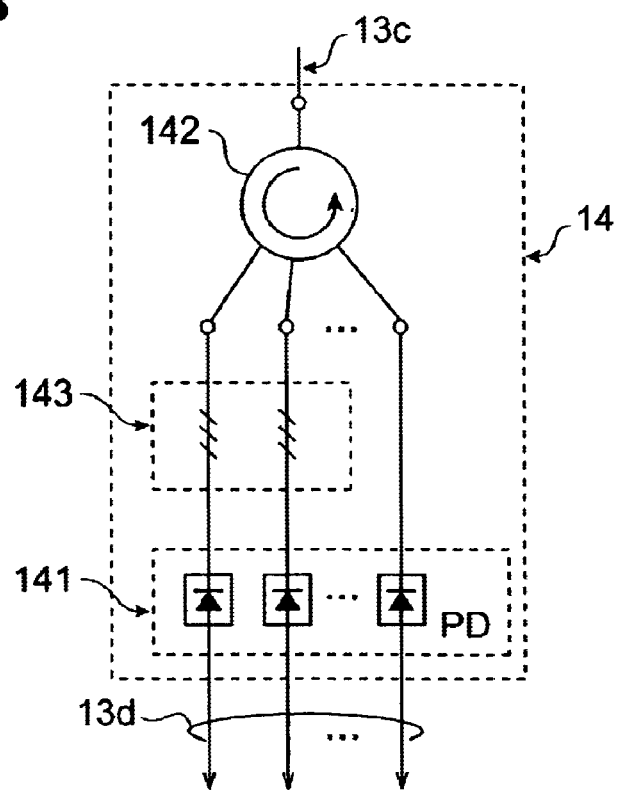

The photodetector 14 comprises an optical branching section for branching signal light and a light-receiving section for receiving thus branched Raman-amplified signal light and converting it into an electric signal. The optical branching section may include an optical circuit comprising an optical filter formed by a dielectric material or the like, or an optical circuit comprising an optical circulator, a Bragg diffraction grating, and the like. In this case, a semiconductor light-receiving device such as photodiode can be employed as the light-receiving section. FIGS. 12A and 12B are diagrams showing other configurations of the photodetector 14. In FIG. 12A, the photodetector 14 comprises an optical filter 140 constituted by a dielectric material or the like for separating the Raman-amplified signal light propagated through the optical fiber 13c into individual signal channels, and a light-receiving section 141 for receiving the individual signal channels of light outputted from the optical filter 140 and outputting respective electric signals corresponding to the individual optical powers to the controller 13e by way of electric signal lines 13d. In FIG. 12B, the photodetector 14 comprises a circulator 142 for separating the Raman-amplified signal light propagated through the optical fiber 13c into individual signal channels; a Bragg grating 143, disposed in each branching line separated from the circulator 142, for transmitting therethrough only a specific frequency; and a light-receiving section 141 for receiving the signal channels of light transmitted through the Bragg grating 143 and outputting respective electric signals corresponding to the individual optical powers to the controller 13e by way of electric signal lines 13d.

When the optical branching section 13a is an optical circuit comprising an optical filter made of a dielectric material, the optical circuit can be constructed inexpensively. When the optical branching section 13a is an optical circuit comprising an optical circulator, a Bragg diffraction grating, and the like, due to a steep optical power blocking characteristic of the Bragg diffraction grating with respect to the optical frequency direction, the accuracy of resolving the optical frequency becomes higher than that in the optical circuit comprising the optical filter, whereby the Raman-amplified signal light can be detected with a higher accuracy. In addition, the optical branching section 13a can be constructed less expensively than in the case where an optical performance monitor such as the optical spectrum analyzer is used.

From FIG. 1, it can be seen that the optical frequency band in which flat Raman amplification is obtained by a pumping channel having one center optical frequency has a width of 4 THz. Therefore, if the center optical frequency interval of N pumping channels is set to 4 THz or less, the individual amplification bands Raman-amplified by N pumping channels of pumping light will be superposed close to each other in the optical frequency direction, whereby the power spectrum flatness of Raman-amplified signal light will improve.

The Raman optical amplifier according to the present invention operates as follows. N pumping channels of pumping light having respective center optical frequencies different from each other outputted from the pumping light source 12a in the pumping light supply section 12 are supplied to the optical fiber 11 by way of the optical multi/demultiplexer 12b and propagate toward the input end 11a. On the other hand, the signal light is fed from the input end 11a of the optical fiber 11 and is Raman-amplified by the pumping light (so as to become Raman-amplified signal light). The Raman-amplified signal light passes through the optical multi/demultiplexer 12b, thereby reaching the optical branching device 13a. Substantially all the Raman-amplified signal light fed into the optical branching device 13a propagates through the optical fiber 11, so as to be outputted from the output end 11b. On the other hand, a part of the Raman-amplified signal light propagates through the optical fiber 13c, thereby reaching the photodetector 14.

Here, the feedback section 13 divides the Raman-amplified signal light into N optical frequency ranges set so as to include respective Raman amplification peaks as optical frequencies lower by about 15 THz than respective center optical frequencies of N pumping channels, and controls the pumping light supply section 12 such that, for example, the Raman-amplified signal light within each optical frequency range attains a power fluctuation of 2 dB or less, preferably 1 dB or less, in order for the detected values based on signal light in these optical frequency ranges to become substantially equal to each other.

In the Raman amplifier 10, as explained in the foregoing, the photodetector 14 divides Raman-amplified signal light into N optical frequency ranges and detects thus divided optical frequency ranges. Then, the controller 13e controls the pumping light supply section 12 such that the respective values of optical frequency ranges detected by the photodetector 14 are equal to each other. Therefore, even when Raman-amplifying signal light in which individual signal channels are multiplexed in the optical frequency direction, the power spectrum of Raman-amplified signal light can be made flat with respect to the optical frequency direction.

Figure 13:
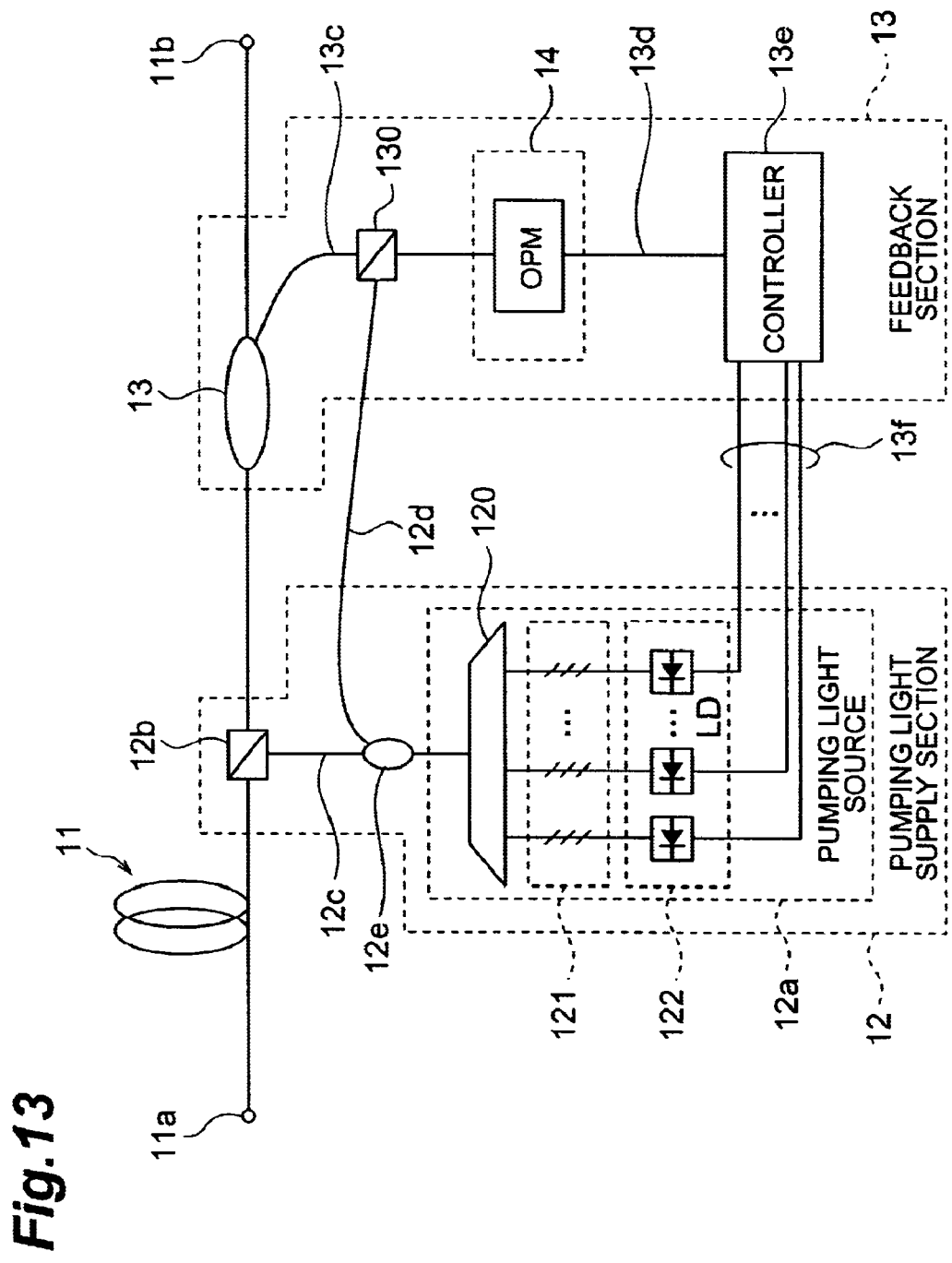
FIG. 13 is a diagram showing the configuration of a second embodiment of the Raman amplifier according to the present invention.

FIG. 13 is a diagram showing the configuration of a second embodiment of the Raman amplifier according to the present invention. The Raman amplifier according to the second embodiment comprises a configuration for controlling the pumping light source 12 such that the values within each optical frequency range (power variation of Raman-amplified signal light) detected by the photodetector 14 have a fluctuation (Raman-amplified signal light power variation) of 2 dB or less, preferably 1 dB or less.

Specifically, the pumping light supply section 12 comprises a pumping light source 12a for outputting a plurality of pumping channels of pumping light, an optical multi/demultiplexer 12b for guiding the pumping light to an optical fiber 11, and an optical multi/demultiplexer 12e for separating a part of the pumping light as monitor light. The pumping light source 12a comprises LDs 122 for outputting pumping light components having respective center optical frequencies different from each other, gratings 121 for eliminating unnecessary wavelength components from respective pumping channels, and a multiplexer 120 for multiplexing the individual pumping channels of pumping light.

The photodetector 14 of the feedback section 13 includes an optical performance monitor (OPM), and an optical multi/demultiplexer 130 for guiding a part of pumping light to an optical fiber 13c in order for the OPM to monitor not only the power of Raman-amplified signal light but also the power of pumping light, whereas the optical multi/demultiplexers 12e and 130 are connected to each other by an optical fiber 12d.

In the second embodiment, while the controller 13e controls the pumping light source 12a by way of an electric signal line 13f according to the result of detection effected by the photodetector 14, optical frequencies indicating boundaries between optical frequency ranges are determined when dividing the Raman-amplified signal light into optical frequency ranges having a number identical to that of pumping channels. In particular, when an occurrence of a pumping channel having such a weak power that it does not effectively contribute to Raman amplification is detected, the controller 13e changes the optical frequencies indicating the boundaries between the optical frequency ranges by utilizing a pumping channel other than the pumping channel having the weak power according to the result of detection effected by the photodetector.

Figure 14A:
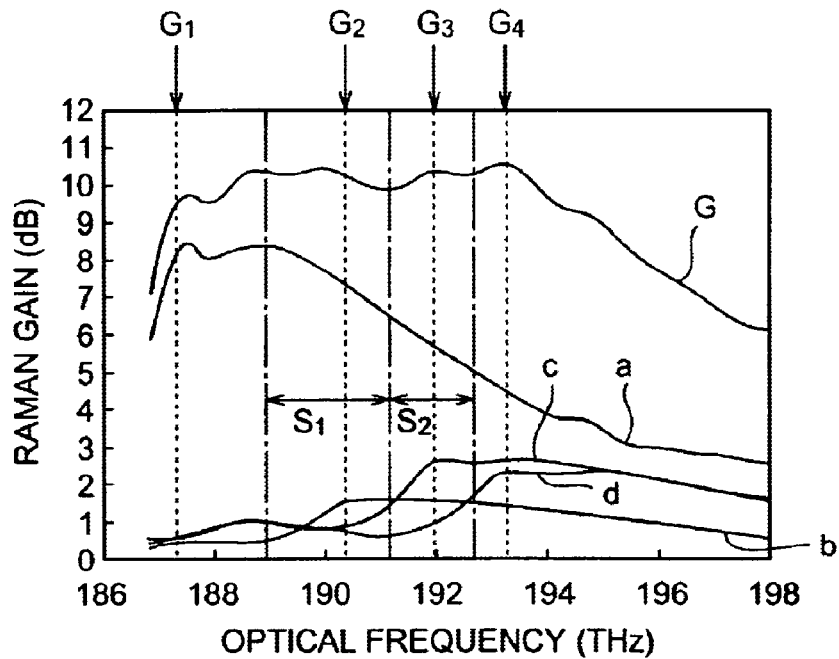
FIGS. 14A and 14B show Raman amplification spectra in Raman amplification of multiplexed signal light before changing the number of channels (from 4) and after changing the number of channels (to 3)

FIG. 14A shows Raman gains (Raman-amplified signal light power spectra) obtained when four pumping channels of pumping light are supplied. The respective center optical frequencies of pumping channels supplied are 202.3 THz (1481.9 nm), 205.4 THz (1459.5 nm), 207.0 THz (1448.3 nm), and 208.2 THz (1439.9 nm). In FIG. 14A, respective spectra a to d are Raman amplification spectra caused by the individual pumping channels of pumping light, whereas spectrum G is a superposed spectrum obtained when these spectra a to d are superposed. In the superposed spectrum G, Raman amplification peaks (optical frequencies lower by about 15 THz than the respective center optical frequencies of individual pumping channels) $G_1$ to $G_4$ exist so as to correspond to the individual pumping channels. When four pumping channels of pumping light are supplied as such, the controller 13e divides the Raman-amplified signal light into optical frequency ranges $S_1$, $S_2$, and controls the pumping light source 122 so as to suppress the power fluctuation or power average fluctuation of Raman-amplified light in each optical frequency range.

Figure 14B:
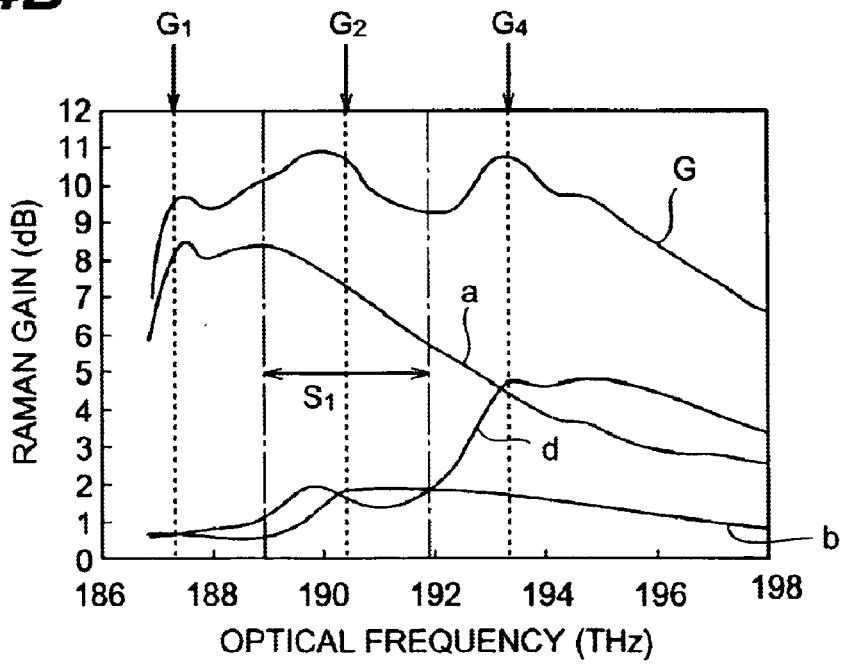

On the other hand, FIG. 14B shows the results of control of the controller 13e in a case where an LD outputting a pumping channel having a center optical frequency of 207.0 THz (1448.3 nm) in the above-mentioned four pumping channels was broken. The respective center optical frequencies of pumping channels supplied are 202.3 THz (1481.9 nm), 205.4 THz (1459.5 nm), and 208.2 THz (1439.9 nm). In the case of FIG. 14B, since spectrum c does not exist, the controller 13e re-divides the Raman-amplified signal light with the optical frequency range $S_1$ widened, and controls the LDs 122 so as to raise the pumping light power of the pumping channel having a center optical frequency of 208.2 THz. It can be seen that superposed spectrum G (Raman-amplified signal light power spectrum) obtained by super-posing spectra a, b, d is flattened thereby. In this superposed spectrum G, Raman amplification peaks (optical frequencies lower by about 15 THz than the respective center optical frequencies of individual pumping channels) $G_1$, $G_2$, and $G_4$ exist so as to correspond to the individual pumping channels.

As a case that pumping power of any one of the pumping channels, for example, a elapsed degradation of LD chip, a failure of temperature control circuit, a fiber broken, and the like can be assumed. The example of FIGS. 14A and 14B shows a case that three pumping channels of 202.3 THz, 205.4 THz and 208.2 THz are effectively remained for the reason that a pumping power of the pumping channel of 207.0 THz reduces 1/10 than a pumping power in normal time. In this embodiment, since the OPM (included in the photodetector 14) monitors each pumping channels, the monitor partitions of the signal light is changed from the partitions shown in FIG. 14A to those shown in FIG. 14B and each pumping power of the remaining three pumping channels is adjusted, and thereby a Raman gain can be flattened.

Figure 15:
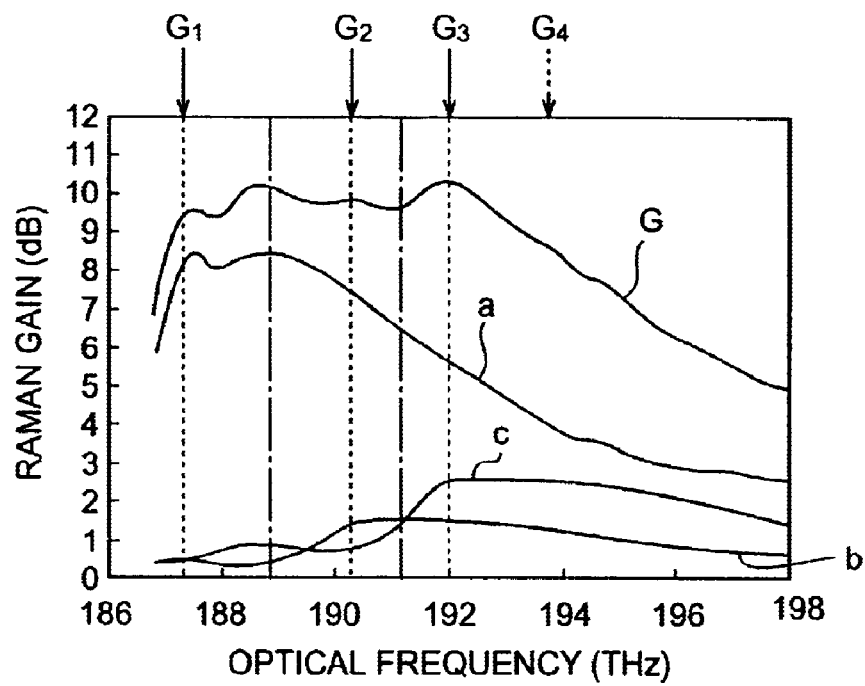
FIG. 15 shows Raman amplification spectra in Raman amplification of multiplexed signal light before changing the number of channels (from 3)

On the other hand, in an optical network, a case that the number of the pumping channels changes can be assumed in accordance with a demand change of subscriber or a failure of the network. If a demand regarding to transmission capacity does not increase and signal light of optical frequencies of 192.5 to 194.5 THz is not used, as shown in FIG. 15, the pumping channel of optical frequency 208.2 THz may be turned set to "OFF". In contrast, when the increase of transmission capacity is occurred at the condition shown in FIG. 15 (Raman amplification by three pumping channel), a flatness of Raman gain can be maintained by changing monitor partitions of signal light as shown in FIG. 14A (Raman amplification by four pumping channels).

Even when the number fluctuation of pumping channels is not occurred by "ON/OFF" of the pumping light sources, a center wavelength of each pumping channel can be caused by a supplied current for the pumping light sources, a distortion added to a fiber grating, and the like. Similar to the above mentioned case, an occurrence of fluctuation of pumping power can be anticipated in a system in action. Accordingly, in view of system maintenance, it is preferable that the controller 13e pumping controls while repeating a monitoring of whole pumping channels and a calculation of signal light partitions.

Figure 16:
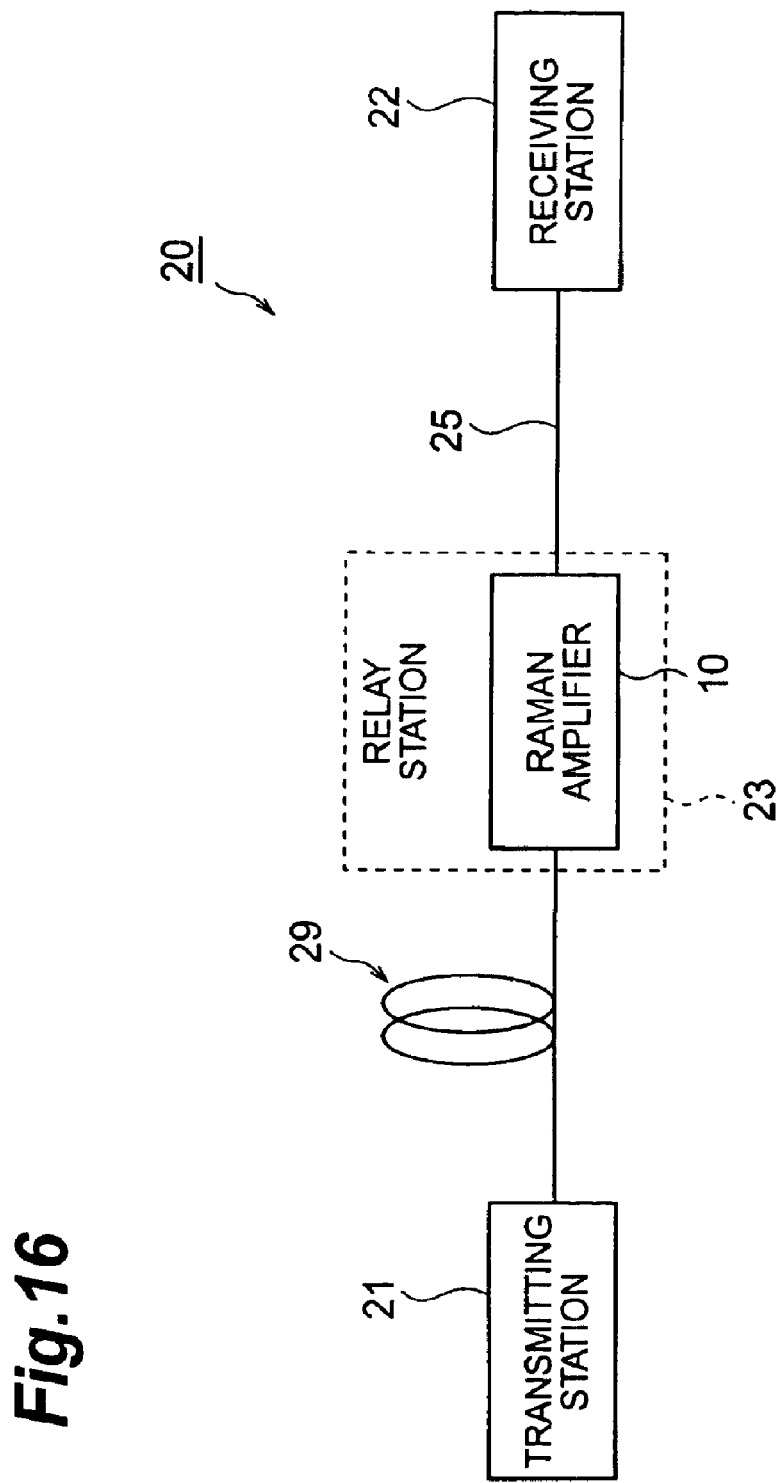
FIG. 16 is a diagram showing the configuration of an embodiment of the optical communication system according to the present invention.

An optical communication system according to the present invention will now be explained. FIG. 16 is a diagram showing the configuration of an embodiment of the optical communication system according to the present invention. In the optical communication system 20, a relay station 23 is disposed between a transmitting station 21 and a receiving station 22, whereas optical fibers 24, 25 are laid in the repeating section between the transmitting station 21 and relay station 23, and the repeating section between the relay station 23 and receiving station 22, respectively. Also, the Raman amplifier 10 comprising the structure mentioned above is disposed in the relay station 23.

In the optical communication system 20, a plurality of signal channels of signal light having respective center optical frequencies different from each other are sent out from the transmitting station 21 to the optical fiber 24. Thus sent signal light is Raman-amplified by the Raman amplifier 10, and then propagates through the optical fiber 25, so as to reach the receiving station 22. Since the optical communication system 20 according to this embodiment includes the above-mentioned Raman amplifier 10, Raman-amplified signal light can correctly be received by the receiving station 22 even in optical communications effected by a plurality of signal channels of signal light (multiplexed signal light) having respective center optical frequencies different from each other.

Though one relay station 23 is disposed between the transmitting station 21 and receiving station 22 in the optical communication system 20 according to this embodiment, a plurality of relay stations 23 may be arranged depending on the distance between the transmitting station 21 and the receiving station 22. While the Raman amplifier 10 is disposed within the relay station 23 in the optical communication system 20 according to this embodiment, the pumping light supply section 12 and feedback section 13 may be disposed alone within the relay station 23, so as to supply the optical fiber 24 with the pumping light fed from the pumping light supply section 12. In this case, the optical fiber 24 functions as an optical fiber for Raman-amplifying the signal light.

In the present invention, as in the foregoing, a Raman amplifier is constituted by an optical fiber for Raman-amplifying a plurality of signal channels of signal light having respective center optical frequencies different from each other; a pumping light supply section for supplying N (N being an integer of 2 or more) pumping channels of pumping light having respective center optical frequencies different from each other to the optical fiber; and a feedback section for detecting a part of the signal light Raman-amplified within the optical fiber when the pumping light is supplied thereto, and controlling the pumping light supply section such that the Raman-amplified signal light has a substantially flat power spectrum with respect to an optical frequency direction according to the result of detection. In particular, the feedback section divides the detected Raman-amplified signal light into N optical frequency ranges defined so as to include respective Raman amplification peaks as optical frequencies lower than respective center optical frequencies of the pumping channels of pumping light by about 15 THz, and controls the pumping light supply section such that the power fluctuation of Raman-amplified signal light in each of thus divided N optical frequency ranges becomes 2 dB or less. As a consequence, even when transmitting signal light in which a plurality of signal channels having respective center optical frequencies different from each other are multiplexed, the power spectrum of Raman-amplified signal light can be made flat with respect to the optical frequency direction.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A Raman amplifier comprising:
   an optical fiber for Raman-amplifying a plurality of signal channels of signal light having respective center optical frequencies different from each other;
   a pumping light supply section for supplying N (N being an integer of 2 or more) pumping channels of pumping light having respective center optical frequencies different from each other to said optical fiber; and
   a feedback section for detecting a part of said signal light Raman-amplified within said optical fiber when said pumping light is supplied thereto, and controlling said pumping light supply section such that said Raman-amplified signal light has a substantially flat power spectrum with respect to an optical frequency direction according to a result of said detection; said feedback section dividing said detected Raman-amplified signal light into N optical frequency ranges defined so as to include respective Raman amplification peaks as optical frequencies lower than respective center optical frequencies of said pumping channels of pumping light by an optical frequency shift of 13.5 to 15.7 THz, and controlling said pumping light supply section such that said Raman-amplified signal light has a power fluctuation of 2 dB or less in each of thus divided N optical frequency ranges.

2. A Raman amplifier according to claim 1, wherein said feedback section controls said pumping light supply section such that said Raman-amplified signal light has a power fluctuation of 1 dB or less in each of said divided N optical frequency ranges.

3. A Raman amplifier according to claim 1, wherein said feedback section comprises:
   a photodetector for monitoring a power of said Raman-amplified signal light and a pumping light power at each of said center optical frequencies of said pumping channels; and
   a controller for determining, when dividing said Raman-amplified signal light into optical frequency ranges having a number identical to that of said pumping channels, an optical frequency indicating a boundary between said optical frequency ranges according to a result of detection effected by said photodetector.

4. A Raman amplifier according to claim 3, wherein, in at least one of said pumping channels, when a power reduction reaching such a level that can not effectively contribute to Raman amplification is detected according to a result of detection effected by said photodetector, said controller changes said optical frequency indicating said boundary between said optical frequency ranges by utilizing the remaining pumping channels without said pumping channel in which said power reduction is occurred.

5. A Raman amplifier according to claim 3, wherein, when an occurrence of a pumping channel having such a sufficient power that said pumping channel can effectively contribute to Raman amplification is detected according to a result of detection effected by said photodetector, said controller changes said optical frequency indicating said boundary between said optical frequency ranges by utilizing whole pumping channels including said pumping channel having said sufficient power.

6. A Raman amplifier according to claim 3, wherein said photodetector includes an optical performance monitor for detecting multiplexed monitor light in which a plurality of signal channels of said Raman-amplified signal light and a plurality of pumping channels of said pumping light are multiplexed.

7. A Raman amplifier according to claim 1, wherein said integer N=2;
   wherein the first optical frequency range in said N optical frequency ranges divided by said feedback section when detecting said Raman-amplified signal light is a range employing an optical frequency lower by said optical
   frequency shift than a midpoint optical frequency between a longer first center optical frequency and a shorter second center optical frequency in said N optical frequency ranges as a lower limit, and an optical frequency lower by said optical frequency shift than an optical frequency higher than said first center optical frequency by the difference between said first center optical frequency and said midpoint frequency as an upper limit; and
   wherein the second optical frequency range in said N optical frequency ranges divided by said feedback section when detecting said Raman-amplified signal light is a range employing an optical frequency lower by said optical
   frequency shift than said midpoint optical frequency between said first center optical frequency and second center optical frequency as an upper limit, and an optical frequency lower by said optical frequency shift than an optical frequency lower than said second center optical frequency by the
   difference between said second center optical frequency and said midpoint frequency as a lower limit.

8. A Raman amplifier according to claim 1, wherein said integer N is 3 or more, whereas pumping channels having the highest center optical frequency, the n-th (n being an integer of 2 or more) highest center optical frequency, and the lowest center optical frequency in the N pumping channels in pumping light are defined as first, n-th, and N-th pumping channels, respectively;
   wherein the first optical frequency range in said N optical frequency ranges divided by said feedback section when detecting said Raman-amplified signal light is a range employing an optical frequency lower by said optical
   frequency shift than a midpoint optical frequency between said center optical frequency of said first pumping channel and said center optical frequency of said second pumping channel as a lower limit, and an optical frequency lower by said optical frequency shift than an optical frequency higher than said center optical frequency of said first pumping channel by the difference between said center optical frequency of said first pumping channel and said midpoint frequency as an upper limit;
   wherein the n-th (n being an integer of 2 or more but (N−1) or less) optical frequency range in said N optical frequency ranges divided by said feedback section when detecting said Raman-amplified signal light is a range employing an optical frecuency lower by said optical frecuency shift than a midpoint optical frequency between said center optical frequency of said n-th pumping channel and said center optical frequency of the (n+1)-th pumping channel as a lower limit, and an optical frequency lower by said optical frequency shift than a midpoint optical frequency between said center optical frequency of said n-th pumping channel and said center optical frequency of the (n−1)-th pumping channel as an upper limit; and wherein the N-th optical frequency range is a range employing an optical frequency lower by said optical frequency shift than a midpoint optical frequency between said center optical frequency of said N-th pumping channel and said center optical frequency of the (N−1)-th pumping channel as an upper limit, and an optical frequency lower by said optical frequency shift than an optical frequency lower than said center optical frequency of said N-th pumping channel by the difference between said center optical frequency of said N-th pumping channel and said midpoint optical frequency as a lower limit.

9. A Raman amplifier according to claim 1, wherein said pumping channels in said pumping light have a center optical frequency interval of 4 THz or less.

10. A Raman amplifier according to claim 1, wherein said feedback section comprises a photodetector for receiving a part of said Raman-amplified signal light and outputting an electric signal corresponding to a power of said Raman-amplified signal light, and a controller for controlling a pumping light source for supplying said pumping light according to said electric signal outputted from said photodetector.

11. A Raman amplifier according to claim 10, wherein said photodetector includes an optical performance monitor.

12. A Raman amplifier according to claim 10, wherein said photodetector includes a demultiplexing section for demultiplexing said Raman-amplified signal light into said N optical frequency ranges, and a light-receiving section for receiving each of Raman-amplified signal light components demultiplexed by said demultiplexing section.

13. A Raman amplifier according to claim 12, wherein said demultiplexing section includes one of an optical circuit comprising a dielectric optical filter, and an optical circuit comprising an optical circulator and a Bragg diffraction grating.

14. A control method for a Raman amplifier comprising, at least, a Raman amplification optical fiber for Raman-amplifying a plurality of signal channels of signal light having respective center optical frequencies different from each other, and a pumping light supply section, said control method comprising the steps of:

supplying N (N being an integer of 2 or more) channels of pumping light having respective center optical frequencies different from each other to said Raman amplification optical fiber;

detecting a part of said signal light Raman-amplified within said Raman amplification optical fiber when said pumping light is supplied thereto; and dividing said detected Raman-amplified signal light into N optical frequency ranges defined so as to include respective Raman amplification peaks as optical frequencies lower than respective center optical frequencies of said pumping channels of pumping light by an optical frequency shift of 13.5 to 15.7 THz, and controlling said pumping light supply section such that said Raman-amplified signal light has a power fluctuation of 2 dB or less in each of thus divided N optical frequency ranges.

15. A control method according to claim 14, wherein said pumping light supply section is controlled such that said Raman-amplified signal light in each of said divided N optical frequency ranges has a power fluctuation of 1 dB or less.

16. A control method according to claim 14, wherein, when dividing said Raman-amplified signal light into optical frequency ranges having a number identical to that of said pumping channels, an optical frequency indicating a boundary between said optical frequency ranges is determined according to a result of detection of a pumping light power at each of center optical frequencies of said optical frequency ranges.

17. A control method according to claim 16, wherein, in at least one of said pumping channels, when a power reduction reaching such a level that can not effectively contribute to Raman amplification is detected according to a result of detection effected by said photodetector, said optical frequency indicating said boundary between said optical frequency ranges is changed by utilizing the remaining pumping channels without said pumping channel in which said power reduction is occurred.

18. A control method according to claim 16, wherein, when an occurrence of a pumping channel having such a sufficient power that said pumping channel can effectively contribute to Raman amplification is detected according to a result of detection effected by said photodetector, said optical frequency indicating said boundary between said optical frequency ranges is changed by utilizing whole pumping channels including said pumping channel having said sufficient power.

19. A control method according to claim 14, wherein said integer N=2;

wherein the first optical frequency range in said N optical frequency ranges divided by said feedback section when detecting said Raman-amplified signal light is a range employing an optical frequency lower by said optical frequency shift than a midpoint optical frequency between a longer first center optical frequency and a shorter second center optical frequency in said N pumping channels as a lower limit, and an optical frequency lower by said optical frequency shift than an optical frequency higher than said first center optical frequency by the difference between said first center optical frequency and said midpoint frequency as an upper limit; and wherein the second optical frequency range in said N optical frequency ranges divided by said feedback section when detecting said Raman-amplified signal light is a range employing an optical frequency lower by said optical frequency shift than said midpoint optical frequency between said first center optical frequency and second center optical frequency as an upper limit, and an optical frequency lower by said optical frequency shift than an optical frequency lower than said second center optical frequency by the difference between said second center optical frequency and said midpoint frequency as a lower limit.

20. A control method according to claim 14, wherein said integer N is 3 or more, whereas pumping channels having the highest center optical frequency, the n-th (n being an integer of 2 or more) highest center optical frequency, and the lowest center optical frequency in the N pumping channels in pumping light are defined as first, n-th, and N-th pumping channels, respectively;

wherein the first optical frequency range in said N optical frequency ranges divided by said feedback section when detecting said Raman-amplified signal light is a range employing an optical frequency lower by said optical frequency shift than a midpoint optical frequency between said center optical frequency of said first pumping channel and said center optical frequency of said second pumping channel as a lower limit, and an optical frequency lower by said optical frequency shift than an optical frequency higher than said center optical frequency of said first pumping channel by the difference between said center optical frequency of said first pumping channel and said midpoint frequency as an upper limit;

wherein the n-th (n being an integer of 2 or more but (N−1) or less) optical frequency range in said N optical frequency ranges divided by said feedback section when detecting said Raman-amplified signal light is a range employing an optical frequency lower by said optical frequency shift than a midpoint optical frequency between said center optical frequency of said n-th pumping channel and said center optical frequency of the (n+1)-th pumping channel as a lower limit, and an optical frequency lower by said optical frequency shift than a midpoint optical frequency between said center optical frequency of said n-th pumping channel and said center optical frequency of the (n−1)-th pumping channel as an upper limit; and wherein the N-th optical frequency range is a range employing an optical frequency lower by said optical frequency shift than a midpoint optical frequency between said center optical frequency of said N-th pumping channel and said center optical frequency of the (N−1)-th pumping channel as an upper limit, and an optical frequency lower by said optical frequency shift than an optical frequency lower than said center optical frequency of said N-th pumping channel by the difference between said center optical frequency of said N-th pumping channel and said midpoint optical frequency as a lower limit.

21. An optical communication system including the Raman amplifier according to claim 1.

22. A Raman amplifier comprising:

an optical fiber for Raman-amplifying a plurality of signal channels of signal light having respective center optical frequencies different from each other;

a pumping light supply section for supplying N (N being an integer of 2 or more) pumping channels of pumping light having respective center optical frequencies different from each other to said optical fiber; and a feedback section for detecting a part of said signal light Raman-amplified within said optical fiber when said pumping light is supplied thereto, and controlling said pumping light supply section such that said Raman-amplified signal light has a substantially flat power spectrum with respect to an optical frequency direction according to a result of said detection; said feedback section dividing said detected Raman-amplified signal light into optical frequency ranges having a number identical to that of said pumping channels of said pumping light, and controlling said pumping light supply section such that said Raman-amplified signal light included in each of thus divided optical frequency ranges has a power average fluctuation of 2 dB or less, wherein said feedback section comprises:

a photodetector for monitoring a power of said Raman-amplified signal light and a pumping light power at each of said center optical frequencies of said pumping channels; and a controller for determining, when dividing said Raman-amplified signal light into optical frequency ranges having a number identical to that of said pumping channels, an optical frequency indicating a boundary between said optical frequency ranges according to a result of detection effected by said photodetector.

23. A Raman amplifier according to claim 22, wherein, in at least one of said pumping channels, when a power reduction reaching such a level that can not effectively contribute to Raman amplification is detected according to a result of detection effected by said photodetector, said controller changes said optical frequency indicating said boundary between said optical frequency ranges by utilizing the remaining pumping channels without said pumping channel in which said power reduction is occurred.

24. A Raman amplifier according to claim 22, wherein, when an occurrence of a pumping channel having such a sufficient power that said pumping channel can effectively contribute to Raman amplification is detected according to a result of detection effected by said photodetector, said controller changes said optical frequency indicating said boundary between said optical frequency ranges by utilizing whole pumping channels including said pumping channel having said sufficient power.

25. A Raman amplifier according to claim 22, wherein said photodetector includes an optical performance monitor for detecting multiplexed monitor light in which a plurality of signal channels of said Raman-amplified signal light and a plurality of pumping channels of said pumping light are multiplexed.

26. A control method for a Raman amplifier comprising, at least, a Raman amplification optical fiber for Raman-amplifying a plurality of signal channels of signal light having respective center optical frequencies different from each other, and a pumping light supply section, said control method comprising the steps of:

supplying N (N being an integer of 2 or more) channels of pumping light having respective center optical frequencies different from each other to said Raman amplification optical fiber: detecting a part of said signal light Raman-amplified within said Raman amplification optical fiber when said pumping light is supplied thereto; and dividing said detected Raman-amplified signal light into optical frequency ranges having a number identical to that of said pumping channels of said pumping light, and controlling said pumping light supply section such that said Raman-amplified signal light included in each of thus divided optical frequency ranges has a power average fluctuation of 2 dB or less, wherein, when dividing said Raman-amplified signal light into optical frequency ranges having a number identical to that of said pumping channels, an optical frequency indicating a boundary between said optical frequency ranges is determined according to a result of detection of a pumping light power at each of center optical frequencies of said optical frequency ranges.

27. A control method according to claim 26, wherein, in at least one of said pumping channels, when a power reduction reaching such a level that can not effectively contribute to Raman amplification is detected according to a result of detection effected by said photodetector, said optical frequency indicating said boundary between said optical frequency ranges is changed by utilizing the remaining pumping channels without said pumping channel in which said power reduction is occurred.

28. A control method according to claim 26, wherein, when an occurrence of a pumping channel having such a sufficient power that said pumping channel can effectively contribute to Raman amplification is detected according to a result of detection effected by said photodetector, said optical frequency indicating said boundary between said optical frequency ranges is changed by utilizing whole pumping channels including said pumping channel having said sufficient power.

* * * * *